United States Patent Office 3,544,297
Patented Dec. 1, 1970

3,544,297
ANTICAKING TREATMENT OF UREA BY POLYMERIZED RESINS
James Passmore, Long Beach, Calif., assignor to Petrochemicals Company, Inc., Fort Worth, Tex.
No Drawing. Filed May 26, 1967, Ser. No. 641,490
Int. Cl. C05c 9/00
U.S. Cl. 71—28  4 Claims

ABSTRACT OF THE DISCLOSURE

A method of reducing the tendency of nitrogen containing compounds of the type used as fertilizers, such as urea, to form into hard agglomerates or a cake during storage, by mixing with a polymerized resin such as polyethylene, polyvinyl chloride and polyacrylonitrile.

CROSS-REFERENCES TO RELATED APPLICATIONS

Patent application Ser. No. 608,718, filed Dec. 19, 1966, James Passmore, inventor, entitled Anticaking Material and Method of Using Same.

BACKGROUND OF THE INVENTION

Field of the invention

Method of treating nitrogen containing compounds of the type used as fertilizers with a finely divided plastic material that may be either of the thermosetting or thermoplastic type to lessen the tendency of the compounds to form into hard cakes during storage thereof.

Description of the prior art

Heretofore various anticaking agents have been employed in an attempt to minimize the caking of nitrogen containing particled compounds. Anticaking agents that have been used for this purpose are finely-divided kaolin, diatomaceous earth, calcium carbonate, and other relatively inert materials, both individually and in combination with an alkyl aryl sulfonate, as disclosed in my copending application, Ser. No. 608,718, filed Dec. 19, 1966, entitled "Anti-caking Material and Method of Forming Same."

The disadvantage of using kaolin, diatomaceous earth, and calcium carbonate as an anticaking agent either individually or in combination with an organo sulfonate on fertilizer compounds is that a substantial amount of the agent must be used, with the weight of the fertilizer compounds being increased substantially without increase in the fertilizer value thereof.

The method described and claimed in the present application involves the use of a finely divided plastic material that may be either of a thermosetting or thermoplastic type dispersed in the dry state onto the surfaces of the individual particles of the nitrogen containing compound to be protected from caking. The advantages of using finely divided plastic material has been found that it is simple and easy to apply to the particles of the nitrogen containing compounds to be anticaked, requires a very small amount to anticake a ton of nitrogen containing compounds, and as a result, the weight of the treated material is not appreciably increased which is, of course, most desirable from an economic standpoint when the treated material is shipped a substantial distance.

SUMMARY OF THE INVENTION

A method of treating particled nitrogen containing fertilizer compounds that have a tendency to cake when stored to lessen this tendency, which includes dispersing finely divided plastic that may be either of the thermosetting or thermoplastic type onto the external surfaces of the particles of fertilizer compound when these particles are in a free flowing condition. The finely divided plastic so used must have the physical characteristics of remaining free flowing when finely divided. The method may also be carried out by the use of finely divided plastic that is intimately mixed with an organo sulfonate of a type later to be described in detail.

A major object of the invention is to provide a method of using a finely divided plastic materal that may be of either the thermosetting or thermoplastic type to anticake nitrogen containing fertilizer compounds such as urea, diammonium phosphate, ammonium nitrate, and the like, against caking when stored, without substantially increasing the weight of the compounds so treated.

Another object of the invention is to supply a method of anticaking, or lessening the tendency of nitrogen containing materials to cake, by the use of finely divided plastic materials as the anticaking agent, which method is simply and easily carried out by tumbling the particled nitrogen containing material when in a freely flowable form with the finely divided plastic material to disperse the latter over the external surfaces of the compound to be protected.

A further object of the invention is to furnish a method of treating nitrogen containing compounds that normally form into a hard cake or agglomerates when stored, whereby it will remain in either a freely flowable state or a soft, easily broken mass, depending upon the quantity of agent used.

DESCRIPTION OF THE PREFERRED EMBODIMENT

In carrying out the method, it has been found that various finely divided plastics may be used as anticaking agents, which plastics may be of either the thermosetting or thermoplastic type, so long as the physical characteristics of the plastic are such that it can be finely divided and remain in a freely flowable condition.

Plastic materials which have been tested for such anticaking purposes include polyvinyl chloride, polypropylene, polyacrylonitrile, and polyethylene. The tendency of nitrogen containing materials of a type used as fertilizers such as urea, diammonium phosphate, ammonium nitrate, and the like, to coalesce into hard agglomerates or cakes during storage is substantially reduced when treated with a finely divided plastic which is dispersed on the surfaces thereof while the particled nitrogen containing compounds are in a freely flowable condition. The plastic is sufficiently finely divided as to cling or adhere to the surfaces of the individual particles of the compound to be anticaked. In testing the effect of finely divided plastic materials as an anticaking agent on nitrogen containing compounds, the following test procedure was carried out:

One hundred fifty grams of a nitrogen containing compound such as urea, diammonium phosphate, and the like, was treated with a predetermined quantity of finely divided plastic in a tared pint jar, and the nitrogen containing compound was tumbled together with the finely divided plastic for two minutes whereby the resulting mixture was split into three equal portions.

A first of these three portions was placed in an eight ounce jar and left uncovered for a predetermined period of time in an undisturbed state. A second portion of the mixture of the nitrogen containing compound and finely divided plastic was placed in a second eight ounce jar, capped, and left standing undisturbed for the same length of time as the first jar. The third portion of the mixture was placed in a straight-walled polyethylene cylinder that was capped at one end, with a stopper being thereafter inserted in the open end thereof.

The cylinder was approximately 3″ long and 1½″ in diameter. After the stopper was inserted therein, the cylinder was placed in a rack, and a weight sufficient to exert a force of two pounds per square inch upon the mixture in the cylinder was placed on the stopper. The dimensions of the stopper were such as to permit the stopper to slidably engage the interior surface of the cylinder adjacent the open end thereof. The mixture of the nitrogen containing compound and the finely divided plastic is left in the cylinder in the rack for the same length of time as the first and second portions, and at the end of this predetermined period of time, the stopper is removed from the cylinder, with the sample then being examined and the conditions noted as follows:

(1) The sample is considered to be caked or partially caked if, when the cylindrical container is inverted for thirty seconds, all or a portion thereof does not break or flow from the lower open end of the container;

(2) The sample in the cylindrical container is considered to be moderately caked if a light tap dislocates the cake and causes it to disintegrate;

(3) The sample is considered to be a hard cake if several taps upon the bottom of the cylindrical container does not cause disintegration of the sample therein, when the container is inverted;

(4) The sample is considered to be uncaked if it flows freely from the cylinder when the cylinder is inverted and the stopper removed therefrom.

Tabulations of test results obtained in a laboratory in the manner described above are set forth below, showing the effect obtained when the finely divided plastic is used alone as an anticaking agent, as well as when finely divided plastic is used in combination with an alkyl aryl sulfonate such as Petro AG Special, which is manufactured and sold by the Petrochemicals Company, Inc., of Fort Worth, Tex.

TEST NO. 1

Polyvinylchloride (PVC) 250 mesh; also combination of petro AG special and PVC on urea prills.

| Sample | Results | | |
|---|---|---|---|
| | Open test— 35 days | Closed test— 35 days | Pressure test— 35 days at 2 p.s.i. |
| Control | Caked | Caked | Caked. |
| 1 lb. PVC per ton urea | Uncaked | Uncaked | Uncaked. |
| 2 lbs. PVC per ton urea | do | do | Do. |
| 3 lbs. PVC per ton urea | do | do | Do. |
| 1 lb. AGS-PVC per ton urea | Caked | Caked | Caked. |
| 2 lbs. AGS-PVC per ton urea | do | do | Do. |
| 3 lbs. AGS-PVC per ton urea | do | do | Do. |

TEST NO. 2

Polypropylene (PP) 100 mesh; also combination of Petro AG Special and PP, on Diamond Phosphate (DAP).

| Sample | Results | | |
|---|---|---|---|
| | Open test— two weeks | Closed test— two weeks | Pressure test— two weeks at 2 p.s.i. |
| Control | Caked | Soft adherent cake. | Caked. |
| 1 lb. PP per ton DAP | Do | Do | Do. |
| 2 lbs. PP per ton DAP | Do | Do | Softer cake, less adherent than control. |
| 3 lbs. PP per ton DAP | Do | Do | Softer cake than 2 lbs. PP per ton. |
| 1 lb. AGS-PP per ton DAP | Softer, less adherent cake. | Softer, less adherent cake. | Caked surface; better than 3 lbs. PP/ton. |
| 2 lbs. AGS-PP per ton DAP | Softer less adherent than 1 lb. per ton. | Softer than 1 lb. AGS-PP. | Same as 1 lb. AGS-PP per ton. |
| 3 lbs. AGS-PP per ton DAP | Same as 2 lbs. per ton. | Softer than 2 lbs. AGS-PP. | Do. |

TEST NO. 3

Urea Prills—Using finely divided polyacrylonitriles

| Sample | Results | | |
|---|---|---|---|
| | Open test— standing— three weeks | Closed test— standing— three weeks. | Pressure test—PAN on Urea Prills—2 p.s.i. at three weeks. |
| Control—no additive | Caked | Caked | Caked. |
| ½ lb. PAN per ton urea | Do | Do | Caked softer than control. |
| ¾ lb. PAN per ton urea | Do | | Do. |
| 1 lb. PAN per ton urea | Do | Caked | Do. |
| 1½ lbs. PAN per ton urea | Do | Do | Uncaked. |
| 2 lbs. PAN per ton urea | Do | Do | Do. |
| 3 lbs. PAN per ton urea | Uncaked | Do | |
| 5 lbs. PAN per ton urea | Do | Uncaked | |

TEST NO. 4

Polyethylene (PE) powder on urea prills

| Sample | Results | | |
|---|---|---|---|
| | Open test—three weeks—standing | Closed test— three weeks | Pressure test — three weeks at 2 p.s. |
| Control—no additive | Caked | Caked–Uniform adherent cake. | Soft adherent cake. |
| ½ lb. PE per ton urea | Caked, softer than control, less adherent. | Caked, but softer and less adherent. | Do. |
| 1 lb. PE per ton urea | Do | Do | Uncaked. |
| 2 lbs. PE per ton urea | Do | Do | Do. |
| 3 lbs. PE per ton urea | Do | Do | Do. |
| 5 lbs. PE per ton urea | Do | Do | Do. |

In carrying out the process, the particled nitrogen containing compound to be protected against caking is tumbled when in the free flowing condition with either a finely divided plastic or a mixture of finely divided plastic and an alkyl aryl sulfonate prepared from an aromatic hydrocarbon containing an olefin as described in my copending application previously identified. This tumbling operation may be carried out with any conventional equipment, so long as the finely divided plastic or finely divided mixture of plastic and sulfonate is intimately mixed with the particled nitrogen containing compound and dispersed over the external surfaces of the particles. The plastic or mixture of plastic and sulfonate must be sufficiently finely divided that it clings or adheres to the external surfaces of the particles of the compound to be protected against caking.

Relative to preparing a mixture of finely divided plastic and an alkyl aryl sulfonate of the type previously described, the proportions of the plastic and sulfonate may be varied, but it is essential that at least sufficient sulfonate be present in the mixture to coat the particles of plastic prior to use of the mixture for anticaking purposes. Coating of the plastic particles in the mixture with the sulfonate is attained by thorough agitation or tumbling of the mixture prior to use for anticaking purposes. Inasmuch as the particles of plastic are to be coated with the sulfonate, it will be apparent that the sulfonate particles must be much smaller than those of the plastic to attain proper results.

I claim:

1. A method of reducing the tendency of particled urea to cake which comprises intimately mixing a finely divided polymerized resin in the dry state selected from a group consisting of polyethylene and polyacrylonitrile with particles of said urea, said urea particles being in a substantially free-flowing condition, the amount of said resin added being in the range of 1–3 pounds per ton of urea, said resin coating the external surfaces of said urea, the amount of said resin being sufficient to prevent caking of said urea while retained under pressure conditions.

2. The method of claim 1 wherein said urea is in the form of urea prills.

3. A method of reducing the tendency of particled urea to cake under atmospheric or pressure conditions which comprises intimately mixing finely divided polyvinyl chloride in the dry state with particles of said urea, said urea particles being in a substantially free-flowing condition, the amount of said resin added being in the range of 1–3 pounds per ton of urea, said resin coating the external surfaces of said urea.

4. The method of claim 3 wherein said urea is in the form of urea prills and said polyvinyl chloride is present in the amount of one pound to each ton of said urea prills.

References Cited

UNITED STATES PATENTS

| | | | |
|---|---|---|---|
| 2,502,996 | 4/1950 | Rohner et al. | 71—64 E XR |
| 2,616,787 | 11/1952 | Whetstone | 71—64E UXR |
| 2,943,928 | 7/1960 | Guth | 71—64 E |
| 3,230,038 | 1/1966 | Wilson | 71—64E XR |
| 3,288,587 | 11/1966 | Campbell et al. | 71—28 XR |
| 3,336,128 | 8/1967 | Holik | 71—28 |

REUBEN FRIEDMAN, Primary Examiner

B. H. LEVENSON, Assistant Examiner

U.S. Cl. X.R.

71—64; 260—555